United States Patent
Mehta et al.

[15] 3,663,179
[45] May 16, 1972

[54] APPARATUS FOR EXOTHERMIC CATALYTIC REACTIONS

[72] Inventors: Dinshaw D. Mehta, New York; Edward J. Miller, Woodhaven, both of N.Y.

[73] Assignee: Chemical Construction Corporation, New York, N.Y.

[22] Filed: Apr. 20, 1970

[21] Appl. No.: 30,101

[52] U.S. Cl. ............................................23/289, 23/288 K
[51] Int. Cl. ..........................................................B01j 9/04
[58] Field of Search ....................23/289, 288, 288 H, 288 K, 23/288 L, 199, 198, 176

[56] References Cited

UNITED STATES PATENTS

| | | |
|---|---|---|
| 3,475,136 | 10/1969 | Eschenbrenner et al. ................23/289 |
| 3,396,865 | 8/1968 | Elmes et al............................23/289 X |
| 3,458,289 | 7/1969 | King et al.................................23/288 |
| 3,459,511 | 8/1969 | Jotoku et al. .............................23/289 |
| 1,931,636 | 10/1933 | Tuck........................................23/289 |
| 3,442,627 | 5/1969 | Wilkinson................................23/289 |
| 3,388,968 | 6/1968 | Spielman et al...................23/289 UX |
| 3,208,833 | 9/1965 | Carson.....................................23/288 |

*Primary Examiner*—Joseph Scovronek
*Attorney*—J. L. Chaboty

[57] ABSTRACT

An apparatus is provided for catalytic ammonia or methanol synthesis, or for other exothermic catalytic reactions, in which the catalyst bed is mounted in a basket which is spaced from the wall of the high pressure container. Cold feed gas or other reaction fluid is circulated upwards between the container shell and the basket, to cool the container, then through an internal heat exchanger for further heating to catalysis temperature, and then downwards through the catalyst bed. One or a plurality of horizontal foraminous pipes are provided in the catalyst bed, and a second gas or fluid of lower temperature is passed through the pipes to provide direct quench of the hot reacting process fluid within the catalyst bed. The final hot reacted fluid is passed through the heat exchange for cooling and then removed from the container.

4 Claims, 3 Drawing Figures

DINSHAW D. MEHTA
EDWARD J. MILLER
INVENTORS.

BY J.?.Chalotyj.
AGENT

DINSHAW D. MEHTA
EDWARD J. MILLER
INVENTORS.

BY [signature]
AGENT

DINSHAW D. MEHTA
EDWARD J. MILLER
INVENTORS.

3,663,179

APPARATUS FOR EXOTHERMIC CATALYTIC REACTIONS

BACKGROUND OF THE INVENTION

1. Field of the Invention

The invention relates to converter apparatus for exothermic catalytic reactions, such as the catalytic synthesis of ammonia or methanol, or exothermic catalytic reactions in petroleum refining or other chemical arts.

2. Description of the Prior Art

Numerous devices such as quench-type converters have been suggested for carrying out exothermic catalytic reactions, either at normal pressures or at elevated pressure. Quench-type converters are described in U.S. Pat. Nos. 3,498,752; 3,475,137; 3,443,910; 3,433,600; 3,366,461; 3,458,289; 3,396,865; 3,475,136; 2,632,692; 2,646,391 and 2,495,262. In the prior art quench-type converters, the quench fluid is generally added to the main reactant stream between separate beds consisting of solid catalyst granules or spheres or the like.

SUMMARY OF THE INVENTION

In the present invention, an apparatus for exothermic catalytic reactions is provided in which cooling of the system is accomplished in an improved manner. The apparatus features a vertically oriented container or reactor vessel, which is provided with an internal catalyst basket in which a bed or charge of catalyst particles is disposed. The basket is spaced from the container wall, and the feed fluid stream such as synthesis gas is passed into the lower portion of the container and external to the basket. The feed fluid rises through the annular space between the basket and the container wall, and thus serves to cool the container and act as insulation against thermal effects or hot spots generated within the catalyst bed. The rising warmed feed fluid stream next flows through an internal heat exchanger within the container, for further heating to suitable catalysis temperature. The hot fluid then flows downwards through the catalyst bed, in which an exothermic catalytic reaction such as ammonia or methanol synthesis takes place. A foraminous or perforated pipe, or a group of such pipes, is disposed in the catalyst bed, and a cold quench fluid, which may be of a composition comparable to the feed stream is passed through the pipes and distributed into the hot reacting gas within the catalyst bed, to provide a cooling effect and thereby moderate the catalytic reaction. The final hot fully reacted fluid stream discharged from the lower end of the catalyst bed is passed through the internal heat exchanger for cooling and is then removed from the container.

The principal advantage of the invention is that exothermic catalytic reactions may be carried out in an improved manner, without overheating of the container or internals and with effective moderation and control of the reaction. Another advantage is that the apparatus is relatively simple and is readily fabricated, constructed and erected. An advantage is that the catalyst charge may readily be removed for periodic replacement or reactivation, by means of a lower catalyst dropout fitting.

It is an object of the present invention to provide an improved apparatus for exothermic catalytic reactions.

Another object is to provide an improved quench-type converter for exothermic catalytic reactions.

A further object is to provide an apparatus for exothermic catalytic reactions in which the reaction is moderated and controlled, and the development of hot spots in the catalyst bed or overheating of the container is prevented.

An additional object is to provide an apparatus for exothermic catalytic reactions which is relatively simple and readily fabricated, constructed and erected.

These and other objects and advantages of the present invention will become evident from the description which follows.

DESCRIPTION OF THE DRAWINGS AND PREFERRED EMBODIMENTS

Referring now to the drawings.

Figure 1:
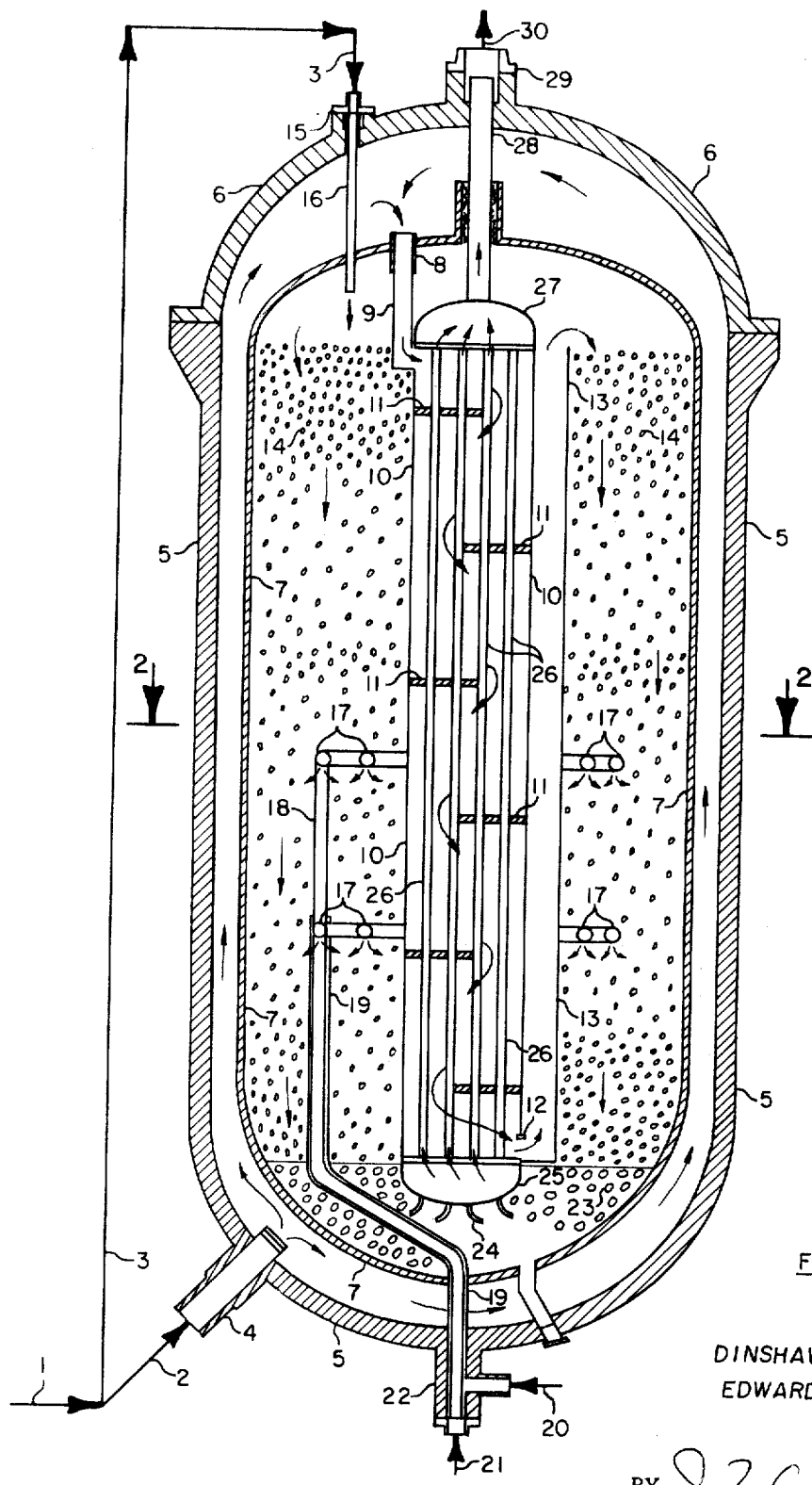
FIG. 1 is a sectional elevation view of one embodiment of the invention.

Referring now to FIG. 1, fluid feed stream 1, which typically consists of ammonia or methanol synthesis gas, is divided into the main feed stream 2 and optional heat exchange bypass stream 3. Stream 2 is passed via inlet high pressure fitting 4 into the vertically oriented converter or rector vessel 5, which in this embodiment is a high pressure cylindrical container provided with an upper dome-shaped closure cover 6. A vertically oriented generally cylindrical catalyst basket 7 is coaxially mounted within the shell or container 5, and spaced from the inner wall or unit 5 to provide an annular passage for upwards flow of stream 2, which thereby cools the side wall of unit 5. The warmed feed fluid reverses direction within cover plate 6, and flows downwards via the gas-tight fitting 8, which is flexible to accommodate for thermal expansion. The warmed fluid flows through fitting 8 into duct 9, which conducts the fluid into the shell 10 of a vertically oriented axial heat exchanger unit which is coaxially disposed within basket 7. A plurality of substantially horizontal fluid diversion baffles 11 are provided within shell 10, and baffles 11 serve to divert the warm fluid external to the tubes of the heat exchanger for further heating.

The fully heated feed fluid produced at the bottom of shell 10 passes via outlet opening 12 into the riser conduit 13, which conducts the hot feed fluid to the top of the catalyst bed 14, where the hot feed fluid is discharged below the top cover plate of the catalyst basket 7 and reverses direction, for downwards flow through catalyst bed 14. Suitable fluid distribution means such as perforated horizontal pipe, not shown, which may be circular, may extend from the upper end of pipe 13. Heat exchanger bypass stream 3 flows downwards via pressure fitting 15 and pipe 16, and stream 3 is discharged from pipe 16 into the hot feed fluid above bed 14, for temperature control.

The feed fluid flows downwards through the upper portion of catalyst bed 14, and an exothermic catalytic reaction such as ammonia or methanol synthesis takes place, which results in an elevation of the temperature of the downflowing fluid. Temperature rise is moderated in accordance with the present invention by the provision of a plurality of horizontal perforated circular pipes 17, which are arranged on two levels and concentrically about the central axis of the container 5 and catalyst basket 7. The upper pipes 17 receive cold quench fluid via riser pipe 18, and the quench fluid in most cases will be similar in composition to stream 1, and may be derived from stream 1. The lower pipes 17 receive cold quench fluid via the annular passage between pipe 18 and outer concentric pipe 19. This quench fluid stream 20, as well as quench fluid stream 21 passed to upper pipes 17 via riser pipe 18, are passed into the apparatus via lower fitting 22. The quench fluid streams 20 and 21 are preferably derived from stream 1 and are directly injected into the hot reacting fluid in the catalyst bed via the perforations in the foraminous pipes 17, and mix with the hot fluid to provide a cooling effect and moderate the exothermic catalytic reaction.

The resulting fully reacted fluid stream discharged downwards from bed 14 flows into the lower bed 23 consisting of discrete inert solids which are generally spherical refractory shapes of greater dimension than the catalyst particles. A catalyst dropout fitting extends downwards from bed 23 to permit removal of the catalyst bed for periodic replacement or regeneration. The hot reacted fluid stream flows into bed 23 from where it is removed by the generally curved collector tubes 24, which conduct the hot fluid into lower heat exchanger tube header 25. The hot fluid passes from header 25 into the plurality of vertically oriented heat exchanger tubes 26, and flows upwards through tubes 26, thus serving to heat the downflowing shell-side feed fluid. The cooled reacted fluid is discharged upwards from tubes 26 into upper tube header 27, and the cooled reacted fluid collected in header 27 is passed upwards via duct 28 and pressure fitting 29 for discharge as stream 30, which now passes to product recovery or other processing, not shown.

Figure 2:
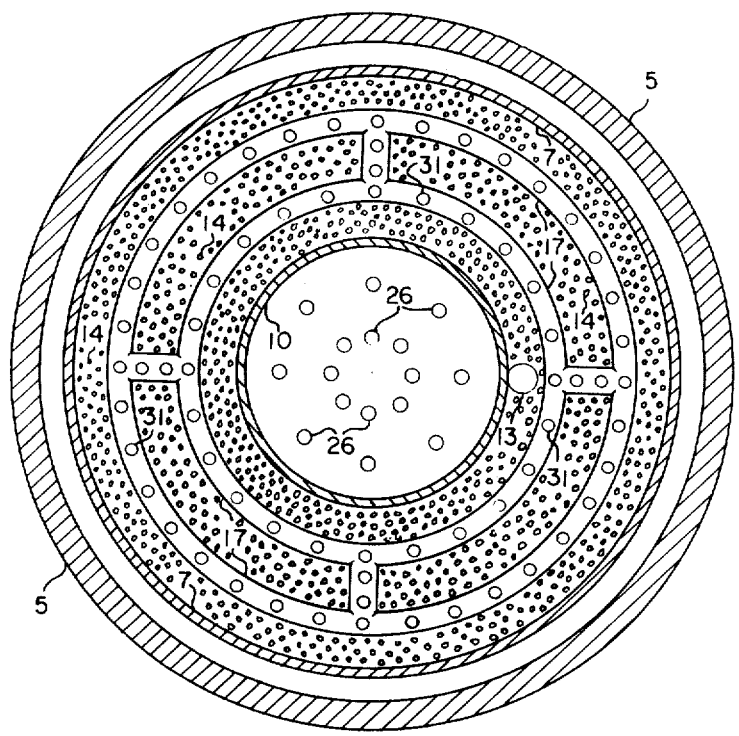
FIG. 2 is a sectional plan view of FIG. 1, taken on section 2—2.

Referring now to FIG. 2, which is a sectional plan view of FIG. 1 taken on section 2—2, the concentric coaxial arrangement of the heat exchanger shell 10 and internal heat exchange tubes 26, quench pipes 17 provided with quench fluid discharge holes 31, basket 7 and converter or container 5, is illustrated. The disposition of catalyst bed 14 between basket 7 and heat exchanger shell 10 and external to pipes 17 is also shown.

Figure 3:
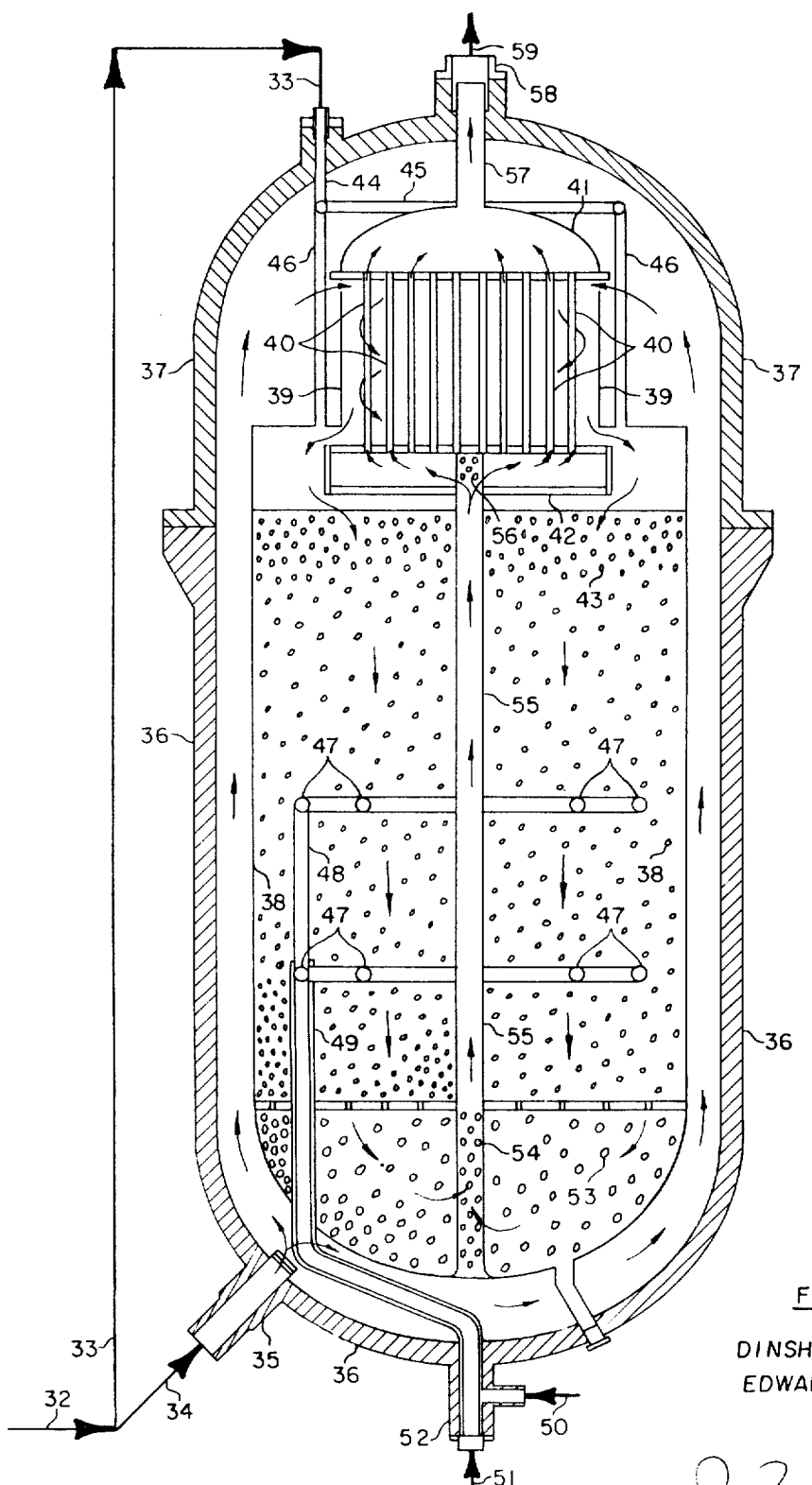
FIG. 3 is a sectional elevation view of an alternative embodiment of the invention.

Referring now to FIG. 3, an alternative embodiment within the scope of the present invention is shown, in which the internal gas-to-gas indirect heat exchanger is disposed above the catalyst bed. Feed fluid stream 32 is divided into optional heat exchanger bypass stream 33 and the main feed fluid stream 34, which flows via pressure fitting 35 into the converter shell 36, which is provided with the upper dome-shaped extension section 37 in which the heat exchanger is disposed. Stream 34 flows upwards in the annular space between container 36 and internal catalyst basket 38, and thereby cools the wall 36. The resulting warmed feed fluid flows upwards into section 37 external to shell 39, and inwards at the upper openings in shell 39. The feed fluid next flows downwards within shell 39 and external to the vertically oriented heat exchanger tubes 40, and is thereby further warmed. The heat exchange tubes 40 extend between upper tube header 41 and lower tube header 42. The feed fluid stream flowing downwards external to tubes 40 is diverted laterally outwards by header 42, and flows downwards around the outer periphery of header 42 and into catalyst bed 43. Bypass stream 33 flows via pipe 44 into manifold or header 45, from which the bypass fluid is discharged by vertical pipes 46 into the hot feed fluid adjacent to header 42, for temperature control.

The feed fluid flows downwards through the upper portion of bed 43, and an exothermic catalytic reaction takes place. The resultant elevation in reacting fluid temperature is moderated by the provision of circular foraminous quench pipes 47, which are concentrically spaced at two elevations about the central axis of the catalyst basket 38. Quench fluid is distributed to the upper pipes 47 by riser pipe 48, and to the lower pipes 47 in the annular passage between pipe 48 and outer concentric pipe 49. The quench fluid stream 50 flows upwards in this annular passage between pipes 49 and 48 to the lower pipes 47, and quench fluid stream 51 flows through pipe 48 to the upper pipes 47. The quench fluid streams 50 and 51 may be portions of stream 32, and in any case streams 50 and 51 are admitted into the apparatus via bottom pressure fitting 52.

The resulting hot reacted fluid discharged downwards from bed 43 flows into lower bed 53 consisting of discrete inert refractory shapes such as spheres, which are generally of larger dimension than the catalyst particles in bed 43. The hot reacted fluid flows centrally inwards in bed 53 and into the lower foraminous section 54 of the hot fluid riser duct 55, which extends centrally upwards and conducts the hot reacted fluid from section 54 upwards through bed 43 and into lower tube header 42. The hot reacted fluid is discharged from duct 55 via upper foraminous outlet 56 and into header 42, and the hot reacted fluid then flows from header 42 upwards through tubes 40 for indirect heat exchange with feed gas. The cooled reacted fluid discharged upwards from tubes 40 into upper header 41 is removed via central duct 57 and pressure fitting 58 as stream 59.

Numerous alternatives within the scope of the present invention will occur to those skilled in the art. The apparatus is primarily directed to usage in catalytic methanol or ammonia synthesis, in which case the process fluid will be a synthesis gas principally containing hydrogen and carbon oxides in the case of methanol synthesis or hydrogen and nitrogen in the case of ammonia synthesis. Other gaseous or liquid feed fluids may be provided for other exothermic catalytic reactions in suitable instances, employing the apparatus of the present invention. Streams 3 or 33 may be omitted in some instances. The foraminous pipes 17 or 47 may be arranged in any suitable configuration within the catalyst bed, and one or a plurality of foraminous pipes may be provided in suitable cases.

We claim:

1. In an apparatus for exothermic catalytic reactions which comprises a vertically oriented cylindrical container, a central coaxial vertical tube heat exchanger axially disposed within said container and provided with upper and lower headers, an annular catalyst bed in said container disposed between the shell of said heat exchanger and an outer vertical cylindrical catalyst basket, said basket being coaxially disposed within said container and spaced from the inner wall of said container, whereby an annular passage for fluid flow is defined between said basket and said container, means to pass a first fluid stream into the lower portion of said container and external to said basket, whereby said first stream flows upwards in the annular passage between said basket and the wall of said container and is heated and thereby cools the wall of said container, upper means to pass the heated first stream to the shell of said heat exchanger, whereby said first stream flows downwards through the shell of said heat exchanger and is further heated, means to pass the resulting hot first stream from the lower end of the shell of said heat exchanger to the top of said catalyst bed, whereby said resulting hot first stream flows downwards through said catalyst bed and is reacted in an exothermic catalytic reaction, and means to quench the reacting first stream within said catalyst bed, the improvement which comprises at least one circular horizontal foraminous pipe, said pipe being concentrically disposed within said catalyst bed, means to pass a second fluid stream through said pipe, whereby said second fluid stream is dispersed into the hot reacting first stream within said catalyst bed and quench-cools said first stream prior to further downwards flow through said catalyst bed, a lower bed of inert discrete solid particles below said catalyst bed, a plurality of curved hot fluid removal tubes, said tubes being attached to said lower header and depending downwards from said lower header into said lower bed, whereby the reacted fluid stream flows from the bottom of said catalyst bed into said lower bed and upwards through said curved removal tubes and the tubes of said heat exchanger and is cooled, and upper means to remove the cooled reacted fluid stream from said heat exchanger for discharge from said container.

2. The apparatus of claim 1, in which a plurality of concentric circular foraminous pipes are disposed at a constant horizontal elevation within said catalyst bed, said pipes being concentric about the central axis of said container, together with means to pass second fluid stream through all of said pipes.

3. The apparatus of claim 1, in which a plurality of circular foraminous pipes are disposed at different horizontal elevations within said catalyst bed, said pipes being concentric about the central axis of said container, together with means to pass second fluid stream through all of said pipes.

4. The apparatus of claim 1, in which upper means are provided to add a third fluid stream to said resulting hot first fluid stream, prior to passage of said first stream downwards through said catalyst bed, whereby said first fluid stream is cooled prior to entry into said catalyst bed.

* * * * *